O. R. WIKANDER.
PLANETARY GEAR.
APPLICATION FILED MAY 6, 1918.

1,425,430.

Patented Aug. 8, 1922.
2 SHEETS—SHEET 1.

INVENTOR
Oscar Ragnar Wikander

Attorney.

O. R. WIKANDER.
PLANETARY GEAR.
APPLICATION FILED MAY 6, 1918.

1,425,430.

Patented Aug. 8, 1922.
2 SHEETS—SHEET 2.

Fig. 3

INVENTOR
Oscar Ragnar Wikander

By [signature]
Attorney

UNITED STATES PATENT OFFICE.

OSCAR RAGNAR WIKANDER, OF PITTSBURGH, PENNSYLVANIA, ASSIGNOR, BY DIRECT AND MESNE ASSIGNMENTS, TO THE SKAYEF BALL BEARING COMPANY, OF HARTFORD, CONNECTICUT, A CORPORATION OF CONNECTICUT.

PLANETARY GEAR.

1,425,430.  Specification of Letters Patent.  Patented Aug. 8, 1922.

Application filed May 6, 1918. Serial No. 232,768.

*To all whom it may concern:*

Be it known that I, OSCAR RAGNAR WIKANDER, citizen of the United States, and resident of Pittsburgh, county of Allegheny, and State of Pennsylvania, have invented an Improvement in Planetary Gears, of which the following is a specification.

The object of my invention is to equalize the load which is transmitted from the sun or central gear of a planetary gear system, through the planet gears, to the internal gear or to the cage carrying said planet gears, so that an equal amount of torque will be transmitted through each planet gear.

A further object of my invention is to create an elastic connection between the high and low speed shafts of said gearing so as to prevent the transmission of shocks from one shaft to another.

My object is further to provide a double reduction planetary gearing in which the axial shaft portions may be supported with a single fixed bearing, the gearing itself centralizing the axial portions in such manner that fixed shaft bearings may be largely eliminated.

My object is further to support the sun or central gear in axial position within the housing or case through planet gears carrying roller bearing portions rolling in contact with roller bearing portions upon the sun gear and the internal gear or housing.

My invention also consists of improvements hereinafter described whereby the above objects and results are attained, said improvements comprising certain organization and combination of parts which are fully described hereinafter and more particularly defined in the claims.

Figure 1:
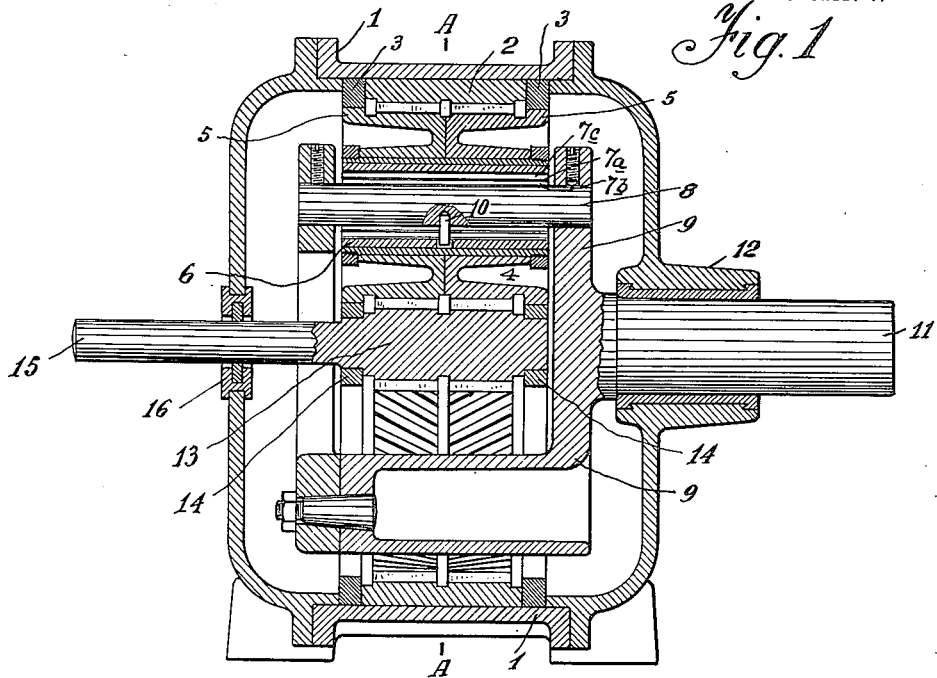
Figure 2:
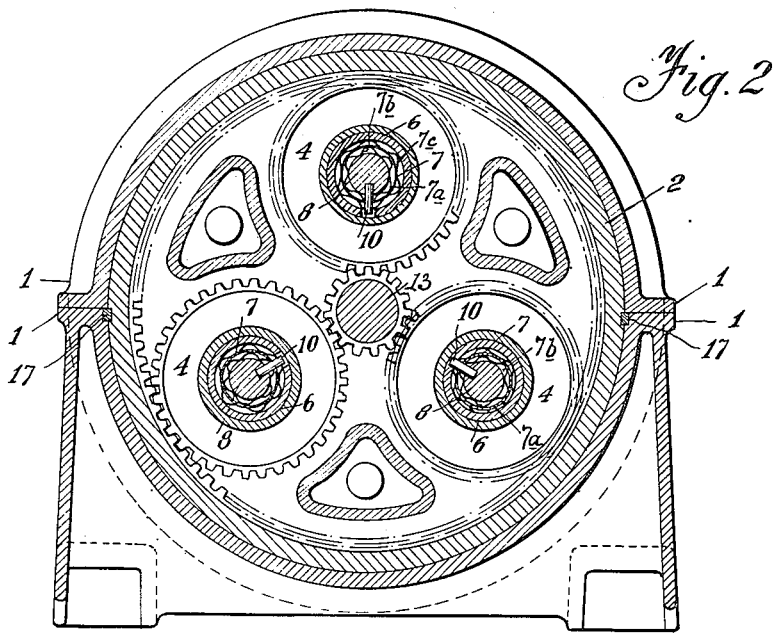
Figure 2:

Referring to the drawings: Fig. 1 is a vertical section taken along the axis of the improved gearing; Fig. 2 is a vertical section across said axis, taken along the line A—A of Fig. 1; and Fig. 3 is a sectional view along the axis of double reduction planetary gearing embodying my invention.

1 is the casing or housing of the apparatus, which carries the stationary internal gear 2 and the internal stationary circular races 3. The planet gears 4 are provided with cylindrical rims 5 which roll on the internal stationary races 3. The planet gears 4 are mounted and revolve on hollow shafts 6, which are carried by means of flexible bushings 7 from the solid shafts 8 of the planet cage 9. Pins 10 secured to the solid shafts may be employed to prevent the hollow shafts 6 from revolving in relation to the solid shafts 8 of the planet cage 9.

The flexible bushings 7 comprise a spring tube 7$^a$ annularly disposed about the solid shaft 8 and interposed between inner and outer annularly arranged corrugated sheet metal spring tubes 7$^b$ and 7$^c$, the crests of the corrugations resting against the spring tube and likewise upon the surfaces of the shaft 8 and hollow shaft 6 as shown; said flexible bushings forming subject matter of a separate application Ser. No. 233,695 filed May 10th, 1918.

The solid shafts 8 are secured to the planet cage 9, which in turn is rigidly connected to the low speed shaft 11, which may be supported by a suitable bearing 12 in the casing 1.

The sun or central gear 13 meshes with the several planet gears 4 and is provided at each end with cylindrical rims 14 which roll on the circular rims 5 on each end of the planet gears, and whereby the sun gear 13 is axially supported. The high speed shaft 15 of the sun gear 13 extends axially outside of the gear case through a stuffing box 16 of any suitable construction capable of permitting adjustment without escape of oil.

If torque is transmitted from the high speed to the low speed shaft, or vice versa, the flexible bushings 7 will be subjected to a certain amount of compression on the side where the torque is transmitted. If the gear is symmetrically built all the bushings 7 will be subjected to the same amount of compression and will transmit equal parts of the total torque.

In order to compensate for the centrifugal forces, which at high speeds will press the planets 4 against the stationary races 3 with considerable power, it may be found advisable to compress the flexible bushings 7 toward the center of the gearing, thereby forcing the planets 4 against the sun gear 12, and this is accomplished by positioning the solid shafts 8 slightly nearer to the axis of the sun gear 13 than the normal distance apart of the axial centers of the gears 4 and 13.

Keys 17 prevent the internal gear 2 and the stationary races 3 from moving circumferentially in relation to the casing 1.

Fig. 3 shows the invention as especially applied to a double reduction planetary gear and in this, the parts of the high speed reduction gear have the same designating numbers as are applied to the corresponding parts of the single reduction gear, shown in Figs. 1 and 2. Referring further to the construction here shown, the high speed case 9 is rigidly connected to the sun gear 18 of the low speed reduction gear. The gear 18 is provided at each end with cylindrical rims 19 which roll on the annular rims 20 of the planet gears 21, and whereby the sun gear 18 is axially supported. The circular rims 20 of the planet gears 21 roll on and are supported by the internal circular stationary races 22, which are mounted, together with the stationary internal gear 23, in the casing 1.

The planet gears 21 are mounted and revolve on hollow shafts 24, which are carried by means of flexible bushings 25 from the solid shafts 26 of the planet cage 27, as in the case of the high speed reduction gear previously described. Pins 28 prevent the hollow shafts 24 from revolving in relation to the solid shafts 26 of the planet cage 27. The flexible bushings 25 are of the same design and construction as the bushings 7 previously described.

The solid shafts 26 are secured to the planet cage 27, which is rigidly connected to the low speed shaft 29 preferably supported by a bearing 30 in the casing or housing 1.

If torque is transmitted from the high speed shaft 15 to the low speed shaft 29, or vice versa, the flexible bushings 25 will equalize the forces transmitted through the planet gears 21 in the same way as the bushings 7 equally divide the torque transmitted through the single reduction gear shown in Figs. 1 and 2 or through the high speed reduction gear in Fig. 3.

The above described constructions represent the preferred embodiment of my invention, but it is evident that other suitable means may be used to guide the planet gears in their orbit, without departing from the spirit of my invention.

It will be observed that the axial portions of the sun gears 13 and 18 and their shafts are unsupported by fixed shaft bearings; and moreover there are no journal bearings between the speed reducing sections of the double reduction gear thereby enabling the system to be very closely coupled. This construction not only saves valuable space and gives increased strength, but also permits of great economy in manufacture of the gearing for given duty over gearing of this general type as heretofore constructed.

By the employment of the flexible bushings 7 and 25 in the combination of parts herein set out, a smooth running and evenly operating gearing is secured, which eliminates the objectionable and injurious transmission of shocks from one shaft to another and from the driving to the driven portions, or vice versa. Moreover, the method of supporting the gears and maintaining them in operative relation herein described as embodied in my improved gearing insures uniform torque distribution and maximum transmission with a minimum weight of gear and wear.

It will now be apparent that I have devised a novel and useful construction which embodies the features of advantage enumerated as desirable, and while I have in the present instance shown and described the preferred embodiment thereof, which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:

1. Planetary gearing, comprising the following parts in combination, a stationary internal gear, a plurality of planet gears meshing with said internal gear equally spaced apart with a maximum angularity not exceeding 120°, a sun-gear meshing with the planet gears, a high speed shaft rigidly connected to the sun-gear and yieldingly supported so as to be capable of radial adjustment when rotating, a low speed shaft connected to and driven by the planet gears, flexible operating means for each of the planet gears and for transmitting direct and radial forces equally between the individual planet gears and low speed shaft, said means permitting the plurality of planet gears to relatively shift their axial positions in a circumferential direction to cause each of the planet gears to automatically maintain equal meshing relation with the internal gear and the sun-gear, whereby the working pressures between the teeth of the planet gears and the stationary internal gear and the sun-gear insure transmission of the power from the sun-gear to the low speed shaft through the several planet gears with equal efficiency.

2. Planetary gearing, comprising the following parts in combination, a stationary internal gear with stationary circular races, planet gears in excess of two meshing with said internal gear and carrying cylindrical rims rolling on the said stationary races, a floating sun gear meshing with all of the planet gears and carrying cylindrical rims rolling on the rims of the planets and thereby centralized and guided, a high speed shaft connected to the sun gear, a low speed shaft connected to the planet gears, and flexible means for transmitting torque and radial forces between the individual planet gears and the low speed shaft, said means permitting the plurality of planetary gears to relatively shift their axial positions to cause each of the planets to mesh with the internal gear and the sun gear to equalize all of the working pressures between the gears and efficiently cause their combined action to transmit the power from the sun gear to the low speed shaft equally through the several planet gears.

3. Planetary gearing, comprising the following parts in combination, a stationary internal gear with stationary circular races, plurality of planet gears meshing with the said internal gear and carrying cylindrical rims rolling on the stationary races, a floating sun gear meshing with all of the planet gears and carrying cylindrical rims rolling on the rims of the planets and thereby centralized, a high speed shaft connected to the sun gear, a low speed shaft, a cage secured to the low speed shaft and provided with pins for the planets, and flexible bushings for transmitting torque and radial forces between the individual planet gears and the respective pins of said cage whereby all of the planet gears equalize their driving power between the stationary gear and the sun gear.

4. Planetary gearing, comprising the following parts in combination, a casing having a bearing at one end, a low speed shaft journaled in the bearing, a cage within the casing carried by the low speed shaft and provided with short shafts for supporting planet gears, an internal gear secured to the casing and surrounding the cage, planet gears each axially journaled with respect to the short shafts of the cage and meshing with said internal gear, a floating sun gear, meshing with the several planet gears in the same plane with the internal gear, a high speed shaft connected with the sun gear and extending loosely through the casing, and guiding means between the sun gear, the planet gears and the internal gear whereby they are held in radial positions relatively to each other, the planet gears acting as roller bearings for the sun gear and the sun gear centralized thereby in being axially journaled with respect to the internal gear.

5. In double reduction gearing, the combination of two sets of planetary gearing, each set comprising a stationary internal gear, planet gears meshing with said internal gear, a sun gear, the said stationary internal gear having stationary circular races, the said planet gears meshing with said internal gear and carrying cylindrical rims rolling in contact with the stationary circular races, a sun gear meshing with the planet gears and carrying cylindrical rims rolling on the rims of the planet gear, a relatively low speed shaft connected with the planet gears of the second reduction gear and journaled in the casing, a high speed shaft connected to the sun gear of the first reduction planetary gear, and an intermediate axial connection between the planet gears of the first reduction gearing and the sun gear of the second reduction gearing, said shaft supported by the gearing independent of the casing.

6. Double reduction planetary gearing, comprising a set of high speed planetary gearing and a set of low speed planetary gearing in combination, each set comprising a stationary internal gear, a planet cage, planet gears carried by the cage and meshing with said internal gear, and a stationary housing rigidly supporting both internal gears, a sun gear meshing with the planet gears, the planet cage of the high speed planetary gearing being directly connected to and wholly supporting the sun gear of the low speed planetary gearing, whereby the two sets of planetary gearing may be closely coupled without the intervention of bearings.

7. Double reduction gearing, comprising a casing and two sets of planetary gearing therein in combination therewith, the sun gear and planet gears of each set having circular rims which roll in contact with the stationary internal gear also having circular races against which the planet rims run, the construction being such that both the planet and sun gears are supported wholly by the internal gear races and the sun gear in turn axially supported by the planet gears, and in which further the planet gears and their cage of one set are closely coupled to the sun gear of the other set, whereby internal bearings on the casing for supporting the coupling between the planet and sun gears are avoided.

8. Double reduction gearing, comprising a casing and two sets of planetary gearing therein coupled in series and each set having a sun gear, planet gears meshing therewith, and a stationary internal gear with which the planet gears mesh, the planet gears of each set supported flexibly with respect to each other whereby they may automatically adjust themselves in action to transmit uniform torque, and in which the planet gears of one set are closely-coupled with the sun gear of the other set and said parts supported directly by the gearing members and independent of the casing, and whereby said planet and sun gears are also flexibly connected so that they may adapt themselves to their respective gear sets without interference with each other.

In testimony of which invention, I hereunto set my hand.

OSCAR RAGNAR WIKANDER,